(12) United States Patent
Moitzheim

(10) Patent No.: US 6,607,680 B1
(45) Date of Patent: Aug. 19, 2003

(54) PROCESS FOR PRODUCING PLASTIC HOLLOW BODIES

(75) Inventor: Juergen Moitzheim, Koenigswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 63 days.

(21) Appl. No.: 09/608,827

(22) Filed: Jun. 30, 2000

(30) Foreign Application Priority Data

Jul. 6, 1999 (DE) .......................................... 199 30 903

(51) Int. Cl.$^7$ .............................................. B29C 44/06
(52) U.S. Cl. ..................... 264/45.4; 264/46.6; 264/510; 264/572
(58) Field of Search ................................ 264/45.4, 572, 264/50, 46.6, 510

(56) References Cited

U.S. PATENT DOCUMENTS 3,901,958 A    8/1975  Doll 5,366,674 A  * 11/1994  Hattori et al. ............. 264/45.4

FOREIGN PATENT DOCUMENTS

| DE | 94 17 813 U1 | 10/1995 |
| DE | 196 48 525 A1 | 5/1998 |
| EP | 0 512 444 A1 | 11/1992 |
| EP | 0 583 542 B1 | 3/1997 |

* cited by examiner

*Primary Examiner*—Allan R. Kuhns
(74) *Attorney, Agent, or Firm*—Akin Gump Strauss Hauer & Feld, L.L.P.

(57) ABSTRACT

In a process and apparatus for producing hollow bodies from plastic material which are at least partially filled with foam, firstly a preform is expanded in a blow molding mold by an increased internal pressure to form a hollow body which is then at least partially filled with foam plastic beads. The compressed beads are introduced into the expanded hollow body while still within the mold, under a pressure which is higher than the pressure obtaining in the hollow body. The beads in the hollow body experience a relief of pressure which results in the increase in volume of the beads and which provides for at least very substantial filling with a foam of at least a delimited part of the volume in the hollow body.

4 Claims, 2 Drawing Sheets

PROCESS FOR PRODUCING PLASTIC HOLLOW BODIES

FIELD OF THE INVENTION

The invention concerns a process and an apparatus for producing hollow bodies of plastic material, and more particularly a process and an apparatus for producing hollow bodies of thermoplastic material which are at least partially filled with foam.

BACKGROUND OF THE INVENTION

Particularly in relation to the manufacture of components for the automobile industry, it is known for hollow bodies of plastic material to be produced for example by a blow molding procedure, whereupon the hollow bodies in the expanded condition are subsequently filled with plastic beads of foam material, also referred to as mini-beads, in order in that way to form a foam filling within the hollow body. In this respect attention may be directed by way of example to German laid-open application (DE-OS) No 196 48 525.

The processes used hitherto for producing automobile components of that kind are fairly complicated as the procedure involves firstly producing the actual hollow body itself, in order subsequently to fill it with the plastic beads in a separate working operation. Amongst other things that is a time-consuming operation. Added to this is the fact that the multiple handling procedures, for example when removing the hollow body from the mold, transporting it to an operating station in which the plastic beads are introduced into the hollow body, when fitting the hollow body into a support mold which is necessary for that phase, and so forth, can mean that the surface of the hollow body frequently suffers damage which, even if it only entails scratches or the like, can adversely affect the appearance of the finished component or make it more difficult to apply a coating of lacquer or paint, or the like.

SUMMARY OF THE INVENTION

An object of the present invention is so to modify a process for producing hollow bodies of thermoplastic material which are at least partially filled with foam, that, while nonetheless affording reliable results, the production of such plastic bead-filled components can be simplified, in particular also in the sense that the hollow body for manufacture of the final product has to be transported or otherwise handled to a reasonably minimum degree.

Another object of the present invention is to provide a process for producing a hollow body from thermoplastic material with an at least partial foam filling, which entails a more rational operating procedure with operating steps in a more logical sequence aimed at minimising potentially quality-hazardous transfer procedures.

Still another object of the present invention is to provide an apparatus for producing hollow bodies of plastic material which are at least partially filled with foam, which can provide for minimising the number of operating components involved in terms of transportation of articles from one part of the apparatus to another.

In accordance with the principles of the present invention the foregoing and other objects are attained by a process for producing hollow bodies of plastic material, which are at least partially filled with foam, wherein firstly a preform is expanded in a blow molding mold by an increased internal pressure therein to form a hollow body therefrom. The hollow body is then at least partially filled with plastic beads of foamed plastic and the plastic beads experience an increase in volume within the hollow body. In this procedure the plastic beads in a compressed condition are introduced into the expanded hollow body while still within the mold, under a pressure greater than the pressure obtaining in the hollow body. The plastic beads in the hollow body then experience a relief of pressure which results in an increase in the volume of the plastic beads within the hollow body, which provides for as complete filling as possible with a plastic foam of the at least one delimited part of the volume of the hollow body which is to be filled with foam.

In the apparatus aspect of the invention the foregoing and other objects are attained by an apparatus for producing hollow bodies of thermoplastic material which are at least partially filled with foam, the apparatus including at least one blow molding mold comprising first and second mold portions, and a device for producing in a preform disposed within the mold cavity of the mold an internal pressure which is higher than the external pressure surrounding the preform, thereby to expand the preform to afford a hollow body. At least a delimited part of the volume of the interior of the hollow body while still in the mold can be communicated with a container for plastic beads which in operation are contained therein under an increased pressure, by way of a closable conduit forming a communication between the mold and the container.

As will be seen in greater detail from an embodiment of the process and apparatus of the invention as set forth hereinafter, the process of the invention provides that firstly a blow molding procedure is used to produce from a preform of suitable material a hollow body which determines the external configuration of the component to be manufactured, for example a bumper for a motor vehicle. After the expansion operation, possibly already beginning in the last phase thereof, a plurality of plastic beads of foam material are injected into the body while still in the mold. The beginning of that injection procedure depends substantially on the pressure conditions obtaining in the hollow body. In general it will be desirable firstly to reduce the preform-expansion or blowing pressure which obtains within the hollow body which has been expanded from the preform, and which can be for example between 10 and 12 bars, so that the plastic beads can be injected into the interior of the hollow body under a comparatively low operating pressure, for example between 2 and 4 bars.

Those small plastic beads which preferably comprise closed-cell plastic material, are therefore put under an increased pressure so that they have thereby experienced a noticeable reduction in volume and are in accordingly a compressed condition. The hollow body while still in the mold, or at least the part of the hollow body which is to be filled with foam, is filled as completely as possible with the plastic beads so that, after the internal space enclosed by the hollow body has been completely relieved of the internal pressure therein, the plastic beads experience a relief of pressure and thus are involved in a certain expansion effect and increase in volume, which generally provides that even regions which have not yet been filled up in the interior of the hollow body are filled by the foam material of the plastic beads. The increase in the volume of the plastic beads can mean that the hollow body is permanently under a certain increased internal pressure. That however does not represent a problem. On the contrary, it has been found that in the above-described manner it is possible to arrive at a closed uniform foam filling within the hollow body, without the necessity for the plastic beads to be joined together by means of welding or in some other fashion. It will be noted however that, with the process according to the invention, it is possible for the plastic beads which bear against the wall of the hollow body to be welded thereto. That will be the case when using compatible materials, whenever the wall of the hollow body is still in a soft plastic condition at the beginning of the operation of injecting the plastic beads which will therefore adhere to the wall of the hollow body.

It is possible to use practically any suitable plastic material which is foamable, for example also polyurethane, for the plastic beads. For the purposes of simplifying disposal however it is desirable for the plastic beads to be made from a material which also constitutes the hollow body. In the case of vehicle bumpers, polypropylene is frequently used for the hollow body. Accordingly in that case the plastic beads should desirably also be made from polypropylene. It is however also possible to use other plastic materials, in particular thermoplastic materials, for production of the hollow body and the plastic beads.

It will be noted that in accordance with a further feature of the invention it is also possible to proceed in such a fashion that the hollow body which for example represents the housing of a vehicle bumper is subdivided into a plurality of chambers which are delimited from each other and which can possibly be filled independently of each other with the plastic beads. In that respect there is the possibility of for example plastic beads of different sizes or plastic beads of properties which differ in other respects being introduced into the individual chambers which are closed off relative to each other, thus affording for example a vehicle bumper which enjoys different properties in terms of absorbing shocks and impacts thereagainst, its flexibility and so forth, in certain regions thereof.

Further objects, features and advantages of the invention will be apparent from the description hereinafter of a preferred embodiment of an apparatus according to the invention.

DESCRIPTION OF THE PREFERRED EMBODIMENT

Figure 1:
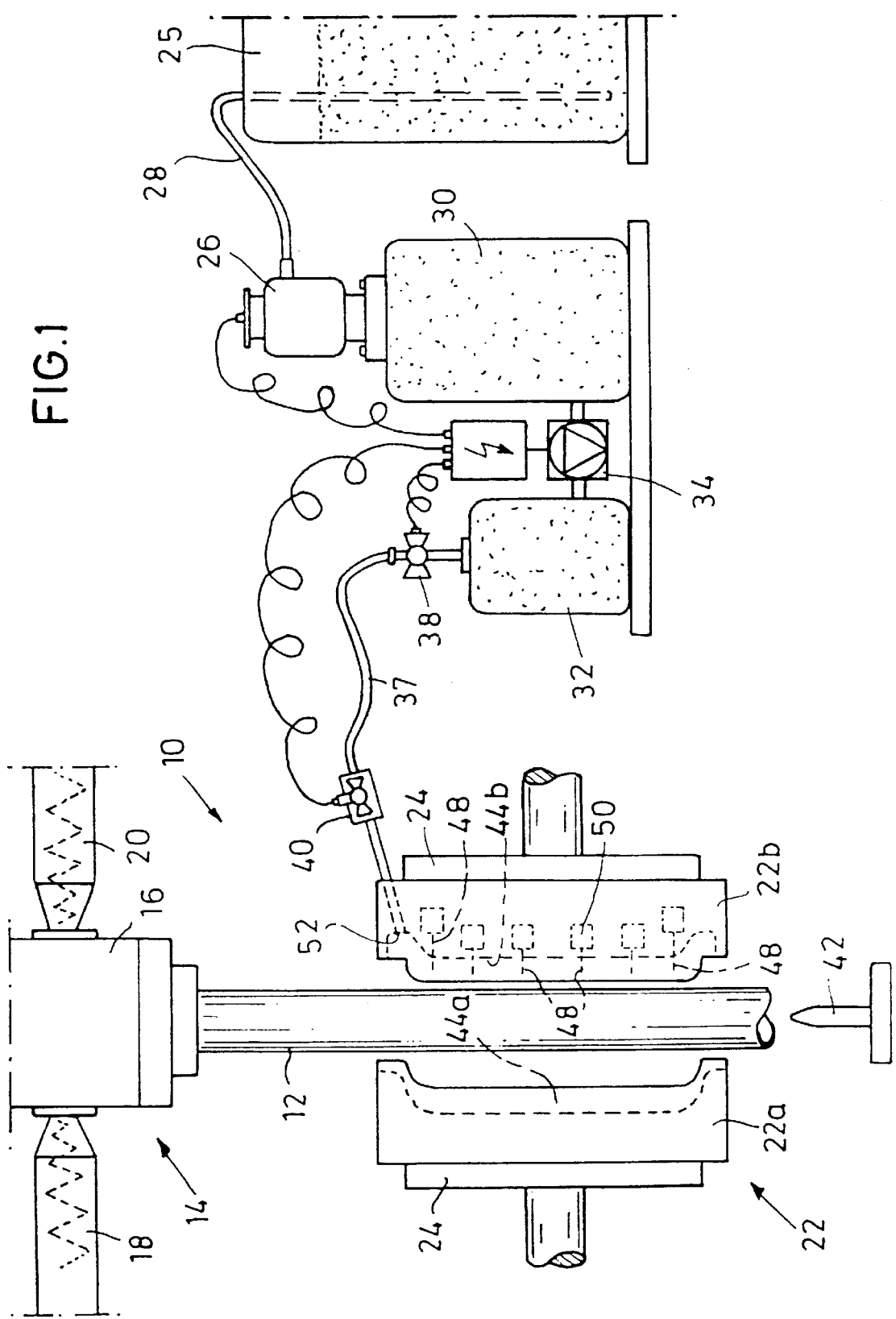
FIG. 1 is a diagrammatic view of an apparatus for producing hollow bodies filled with foam material, showing a blow molding mold in the opened condition.

Referring now generally to the drawing, illustrated therein is an embodiment of an apparatus according to the invention for producing hollow bodies of plastic such as thermoplastic material, which are at least partially filled with foam, for carrying out the corresponding process according to the invention. The illustrated apparatus includes an extrusion blow molding assembly 10 including an extrusion unit 14 which by the extrusion of suitable plastic material serves to produce generally tubular preforms as indicated at 12. Of the extrusion assembly 10, the drawing only shows an extrusion head 16 and, on a greatly reduced scale, two extruders 18 and 20. The use of two extruders affords the possibility of producing a preform 12 whose wall comprises first and second layers in a laminate configuration, in which respect the outer layer can for example comprise a material which can be better painted or lacquered than the inner layer which forms the actual support layer of the preform and the hollow body which is to be subsequently produced therefrom.

Figure 2:
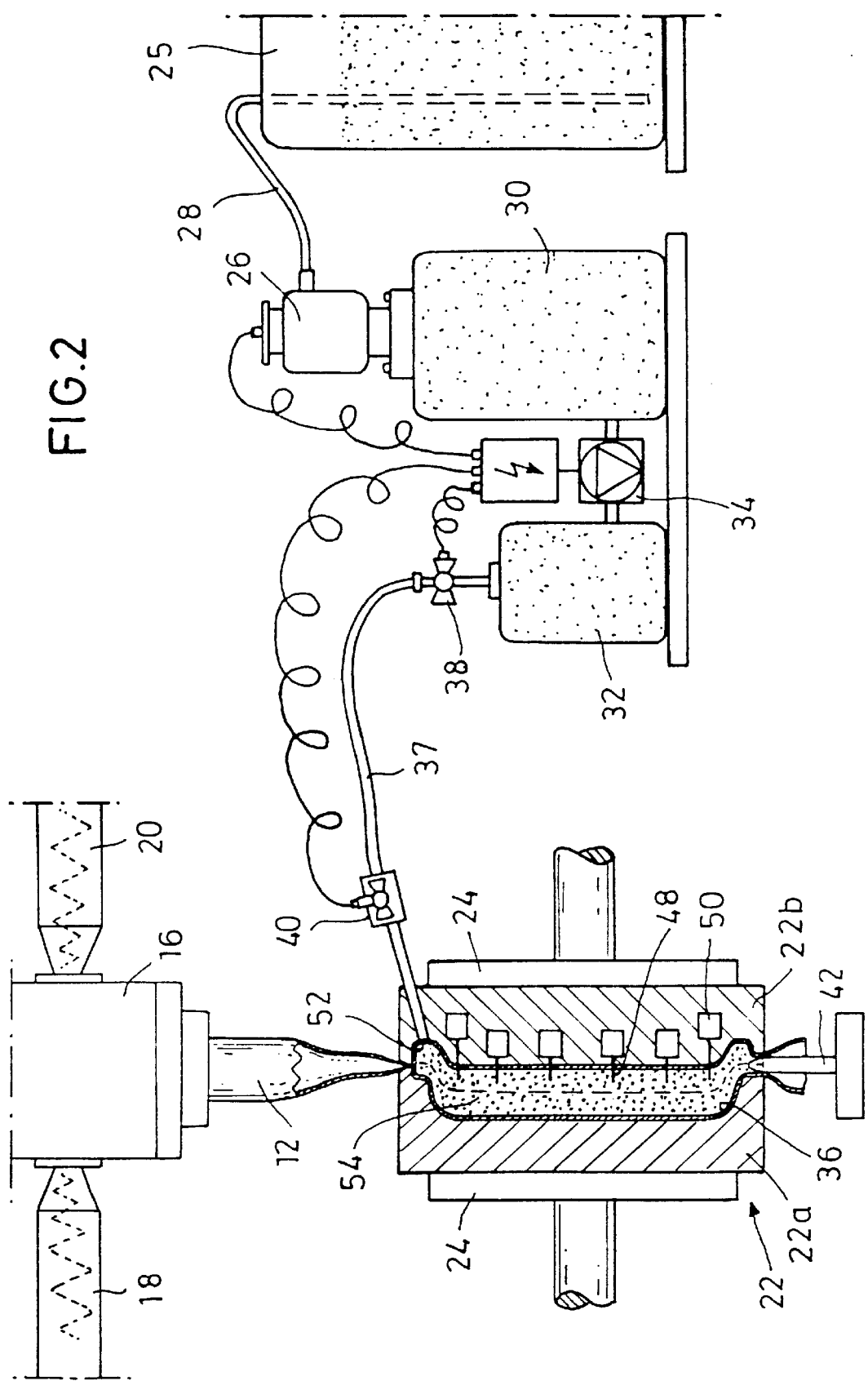
FIG. 2 is a view corresponding to FIG. 1 showing the blow molding mold in the closed condition, with a hollow body therein.

Reference 22 denotes a blow molding mold for receiving the preform 12. The mold 22 is of a two-part configuration and, in the illustrated embodiment, is arranged beneath the extrusion head 16 in such a way that it can receive the preform 12 which is extruded therefrom and which hangs down freely from the extrusion head 16. For that purpose, the mold portions 22a and 22b which are reciprocatable in the plane of the drawing between an open position as shown in FIG. 1 and a closed position as shown in FIG. 2 are firstly moved into the positions in which the mold is open, as in FIG. 1. It will be seen that the two mold portions 22a and 22b are each carried by a respective mounting plate 24.

Arranged at a spacing from the mold 22 is a supply container 25 for containing plastic beads of foamed plastic. The plastic beads are conveyed from the container 25 by means of a conventional conveyor device 26 and by way of a conduit 28 into an intermediate container 30 which is disposed beside the container 25 and which, like same, is under normal pressure.

A pressure container 32 is connected to the intermediate container 30 by way of a pump diagrammatically indicated at reference 34. The pump 34 conveys the plastic beads out of the intermediate container 30 into the pressure container 32 in which at the same time they build up therein an increased pressure which can be for example 2 bars and which at any event must be higher than the pressure which prevails in the interior of the mold 22 or in the interior of the hollow body 36 which, as shown in FIG. 2, has been produced in the mold 22 by expansion of the preform 12 by blow molding thereof.

Connected to the pressure container 32 is a pipe or conduit 37 provided with first and second valves indicated at 38 and 40. The hose or conduit 37 terminates within the mold portion 22b and at that end, as indicated at 52, it is of such a configuration that the interior of the hollow body 36 to be produced from the preform 12 in the mold cavity of the mold 22 can be communicated with the conduit 37 and thus the pressure container 32.

When the preform 12 is in the position shown in FIG. 1, being the position required for the production of a hollow body 36 therefrom, the mold 22 is closed after a blowing nozzle indicated at 42 has firstly been moved from the position shown in FIG. 1 into the position shown in FIG. 2. In the FIG. 2 position, the blowing nozzle 42 projects into the lower open end of the preform 12. The blowing nozzle 42 can also be in the form of a blowing bar which extends into the preform.

After the mold 22 is closed by movement of the mold portions 22a, 22b into the position shown in FIG. 2, the preform 12 is expanded by expansion air being introduced through the blowing nozzle 42 into the preform 12. When that happens, the configuration of the hollow body 36 produced in that procedure is determined by the contour of the mold cavity which is composed of the mold cavity portions 44a and 44b in the respective mold portions 22a and 22b. The operation of introducing blowing air through the blowing nozzle 42 can under some circumstances already be implemented during closure of the mold 22. It will be appreciated however that these involve procedures which are familiar to any man skilled in the field of blow molding. A corresponding consideration also applies in regard to the extrusion procedure for production of the preform 12. For that reason, details in relation to such procedures will not be further set forth herein.

Along the vertical extent of the mold cavity 44a, 44b and thus along the hollow body 36 which is disposed therein, the mold half 22*b* is provided with hollow needles diagrammatically indicated at 48 which, as can be seen in particular from FIG. 1, project beyond the boundary of the mold cavity portion 44*b* into same so that, at the latest upon expansion of the preform 12, the wall thereof is pierced by the hollow needles 48. Each hollow needle 48 is connected to a reduced-pressure source (not shown) by way of an interposed valve of which one is denoted by reference 50.

Finally, the end of the conduit 27 in the mold portion 22*b* may also be provided with a piercing member such as a hollow needle which provides that, upon expansion of the preform 12 within the mold, the end of the conduit 37 pierces the wall of the preform 12 or the hollow body 36 which is being formed therefrom upon expansion of the preform 12, so that, depending on the respective positions of the valves 38 and 40, the conduit 37 is in communication with the internal space 54 defined within the hollow body 36. It will be appreciated that the communication between the conduit 37 and the internal space 54 in the hollow body 36 can also be made in some other fashion, for example by an air blast which is caused to act in a jetting action through the conduit 37 against the wall of the hollow body 36 while still in a hot plastic.condition, thereby to perforate the wall of the hollow body 36 at the location at which the air is jetted thereagainst. It will be noted here that the specific way in which the opening in the wall of the hollow body 36 is made is not an aspect of crucial significance to the invention, as the only important consideration in this respect is that a communication is made by means of the conduit 37 between the pressure container 32 on the one hand and the internal space 54 in the hollow body 36 in the mold 22, on the other hand.

The procedure in more specific terms is that, after the mold 22 is closed, the preform 12 experiences expansion to form the hollow body 36. As soon as the expansion procedure is terminated or shortly thereafter the pressure in the internal space 54 in the hollow body, which can be for example about 10 bars during the expansion procedure, is reduced. That can be effected by way of the blowing nozzle 42 or by way of a venting opening which is provided thereon, but possibly also by way of the hollow needles 48 whose valves 50 have been closed during the expansion procedure. The extent to which the internal pressure in the hollow body 36 is reduced essentially depends on the pressure under which the plastic beads are transported from the pressure container 32 into the internal space 54 in the hollow body. At any event, the pressure in the pressure container 22 must be greater, in which respect, with an increasing pressure difference between the pressure in the pressure container 32 and the pressure in the internal space 34 in the hollow body 36, the speed at which the plastic beads are transported into the internal space 54 within the hollow body 36 is also increased. It will be appreciated however that this transportation of the plastic beads does not in any case represent a serious problem as the plastic beads are on the one hand very small and thus correspondingly light. They are normally of a diameter which is a few millimeters. On the other hand, the pressure in the internal space 54 in the hollow body 36 and thus in the mold 22 must in any case be sufficiently high to provide that the plastic beads experience a certain compression effect, with a reduction in the volume which they have under normal pressure.

In a practical context it has been found that a drop in the pressure in the internal space of the body in the mold 22, to a pressure of about 1 bar above atmospheric is generally sufficient, after the preform 12 has been expanded to form the hollow body whose contour is defined by the contour of the mold cavity of the mold 22, to ensure that, if the hollow body 36 has still not yet hardened to such an extent that it would be substantially rigid in respect of shape, the hollow body 36 retains its configuration which corresponds to the shape of the mold cavity defined by the mold cavity portions 44*a* and 44*b* and in which it bears against the inside wall surface of the mold cavity. When then the plastic beads flow through the conduit 37 into the internal space 54 in the hollow body 36 under an increased pressure of for example 2 bars, it is only necessary to open at least some of the valves 50 operatively associated with the respective hollow needles 48, in order to maintain a pressure drop between the pressure container 32 on the one hand and the internal space 54 in the hollow body 36 on the other hand. In that respect there is the possible option, by virtue of a given selection in respect of the hollow needles 48 to be opened, of controlling filling of the internal space 54 with the plastic beads in such a way that, for example at the beginning of the filling procedure, only the lower hollow needle 48 or the two lower hollow needles 48 is or are opened, thereby producing a flow by which the plastic beads are transported initially into the lower region of the hollow space 54 in the body 36. Then, with an increasing degree of filling of the internal space 54 in the hollow body, the valves 50 of the hollow needles 48 above the lower one or the lower two hollow needles can also be successively opened in an upward progression with the increasing degree of filling of the internal space 54 with the plastic beads, in which case the further downwardly disposed valves 50 may possibly be closed again as they have already performed their function of introducing plastic beads into the adjoining regions of the internal space 54 in the hollow body 6. This procedure will depend more specifically on the respective factors involved, including the flow resistance of the filling of plastic beads which is already in the internal space 54, as an advantageous mode of implementation of the method is one which involves maintaining, up to the end of the filling procedure, an increased pressure within the hollow body 36 which is sufficient to hold the plastic beads in a compressed condition, so that the plastic beads expand within a short period of time after termination of the procedure for filling the hollow body 36 and after the attainment of a condition of pressure equilibrium between the internal space 54 and the external environment. This bead expansion phenomenon is essentially to be attributed to the fact that the air which is enclosed in the cells of the plastic beads and which was previously compressed somewhat under the action of the increased pressure is relieved and thus causes expansion of the plastic beads.

The above-described process in which the plastic beads are firstly compressed and then transported by means of a pressure difference into the hollow body 36 which is in the mold 22, thereupon followed by a pressure equilibrium which results in an increase in the volume of the plastic beads, can take place at ambient temperature, although it is to be assumed that in the normal situation, at the beginning of the filling operation, a temperature which can be for example between about 50 and 80° C. obtains in the mold 22 and thus also essentially in the internal space 54 in the hollow body 36. However, unless special measures are taken, there will in any case be a rapid fall in temperature by virtue of the mold cooling procedure which is normally implemented, with the aim of cooling and thereby setting the wall of the hollow body 36. The conveying air by means of which the plastic beads are conveyed through the conduit 37 into the hollow body 36 will normally also be at a temperature which is not substantially above ambient temperature so that this also entails an additional cooling effect.

The filling which is thus disposed within the hollow body 36, by virtue of the increase in volume of the individual plastic beads after a condition of complete pressure equilibrium has been brought about, then experiences a hardening effect which results in a unitary foam structure whose individual particles however are without exception not joined together. That however is not a matter of disadvantage as the blow-molded hollow body 36 holds the dense foam structure which is formed from the filling therein, in the desired shape.

It is not impossible that, even after the condition of pressure equilibrium obtains, the wall of the hollow body 36 is under a certain internal increased pressure. That can be the case when the free space which remains within the hollow body 36 after the filling procedure is smaller than the amount of space which is taken up by the plastic beads upon complete relief thereof, for the increase in volume which is afforded in that way. The free space which is present at the end of the filling procedure while the increased pressure is still being maintained will be composed of a large number of very small intermediate spaces between the plastic beads and possibly a continuous free space at the upper end of the hollow body, that is to say the region in the proximity of the mouth opening where the conduit 37 opens into the internal space 54. The choice of the size of that free space which still remains in the upper region of the internal space 54 at the end of the filling procedure also makes it possible to control the subsequent increase in volume of the mass of the plastic beads within the hollow body, insofar as for example the filling procedure is terminated when the free space which is still present at that location is sufficient to afford substantially complete relief of the pressure of all plastic beads within the hollow body 36, with a corresponding increase in the volume of the beads.

Moreover there is also the possibility of the hollow body 36 being subdivided into a plurality of individual chambers or portions which are each filled in themselves, possibly with different plastic beads. In this respect, it is also possible to introduce different amounts of plastic beads per unit of volume into the individual chambers in order in that way to afford the production of regions of different densities and thus hardnesses, in dependence on differing degrees of increase in volume or remaining residual stresses in the plastic beads, on the component which is produced by the process such as a vehicle bumper or another component.

At any event, the mold 32 also represents the supporting mold for the hollow body 36 for the process step in which the respective hollow body 36 is filled with the plastic beads. An advantage of the invention in this respect is that, apart from some minor modifications, for example attaching the end of the conduit 37 to the mold portion 22b and providing the hollow needles 48 on the mold portion 22b, it is possible to use a conventional blow molding mold which, in addition to its usual function, also performs an additional function. In this respect, the additional amount of time required for filling the hollow body 36 with the plastic beads does not need to be very great so that the operating cycle for production of a blow molded article in the blow mold is not substantially increased in length. It will be appreciated that in this respect a part is also played by the above-mentioned fact that the filling operation can begin immediately after termination of expansion of the preform 12 in the mold, so that at least a substantial part of the filling operation can be effected in the cooling phase which is required in any case and during which the expanded preform 12 or hollow body 36 still has to remain in the mold 22 in order to experience the necessary hardening effect.

It will be appreciated that the above-described process and apparatus according to the invention have been set forth solely by way of example and illustration of the principles thereof and that various other modifications and alterations may be made therein without thereby departing from the spirit and scope of the invention.

What is claimed is:

1. A process for producing plastic material bodies at least partially filled with foam comprising the steps of:
   expanding a plastic preform in a blow molding mold using an increased internal pressure to form a hollow body;
   providing beads of foamed plastic and compressing the beads under a first pressure to effect a reduction of bead volume in a compressed condition;
   introducing the beads in the compressed condition into at least one delimited part of the expanded hollow body while the hollow body is still in the mold with a second pressure existing inside the hollow body, wherein the first pressure is greater than the second pressure; and,
   relieving the second pressure in the hollow body, such that the beads experience a relief of pressure resulting in an increase in the bead volume within the hollow body to provide as complete a filling as possible of the at least one delimited part of the hollow body,
   wherein the introducing step and the relieving step are carried out in such a manner that the beads do not join together.

2. The process of claim 1, wherein the second pressure is lower than the increased internal pressure for expanding the preform.

3. The process of claim 1, wherein during at least a first phase of the introducing step the hollow body is still in a hot plastic condition at least at an internal wall surface of the hollow body.

4. The process of claim 1, further comprising cooling the hollow body while in the mold to achieve sufficient hardening of the hollow body, wherein the cooling step at least partially overlaps the introducing step and the relieving step.

* * * * *